United States Patent
Melandsø et al.

(10) Patent No.: US 11,815,495 B2
(45) Date of Patent: Nov. 14, 2023

(54) DEVICE, SYSTEM AND METHOD FOR EMISSION AND RECEPTION OF ULTRASONIC SIGNALS TO AND FROM A TEST MATERIAL

(71) Applicant: ELOP AS, Hamar (NO)

(72) Inventors: Terje Melandsø, Furnes (NO); Werner Bjerke, Hamar (NO); Frank Melandsø, Kvaløysletta (NO); Kamal Raj Chapagain, Hamar (NO); Sanat Wagle, Hamar (NO)

(73) Assignee: ELOP AS, Hamar (NO)

( * ) Notice: Subject to any disclaimer, the term of this patent is extended or adjusted under 35 U.S.C. 154(b) by 0 days.

(21) Appl. No.: 17/806,757

(22) Filed: Jun. 14, 2022

(65) Prior Publication Data

US 2022/0341893 A1 Oct. 27, 2022

Related U.S. Application Data

(63) Continuation of application No. 16/309,392, filed as application No. PCT/NO2017/050156 on Jun. 13, 2017, now Pat. No. 11,378,553.

(30) Foreign Application Priority Data

Jun. 13, 2016 (NO) .................................. 20160998

(51) Int. Cl.
*G01N 29/28* (2006.01)
*G01N 29/04* (2006.01)
(Continued)

(52) U.S. Cl.
CPC ........... *G01N 29/28* (2013.01); *G01N 29/043* (2013.01); *G01N 29/225* (2013.01);
(Continued)

(58) Field of Classification Search
CPC .... G01N 29/28; G01N 29/043; G01N 29/225; G01N 29/226; G01N 29/2475;
(Continued)

(56) References Cited

U.S. PATENT DOCUMENTS 3,612,920 A * 10/1971 Bantz ..................... B06B 1/067
73/639
3,732,444 A 5/1973 Miller
(Continued)

FOREIGN PATENT DOCUMENTS

DE 102004061870 B3 6/2006
EP 0001674 A1 5/1979
(Continued)

OTHER PUBLICATIONS

Anonymous, UT Material Properties Tables, UT Material Properties Tables, 2020, 5, 2020.
(Continued)

*Primary Examiner* — Tarun Sinha
(74) *Attorney, Agent, or Firm* — K&L Gates LLP

(57) ABSTRACT

The present disclosure relates to a device for emission and reception of ultrasonic signal to and from a surface under survey, the device includes a stationary shaft part; and two or more wheel assemblies attachable to a stationary shaft part. Each wheel assembly includes an orbital inner ring, an orbital outer ring, and one or more transducers mounted on the outward facing surface of the orbital inner ring protruding radially from the orbital inner ring. The orbital outer ring being arranged radially outside the transducer modules with the orbital inner ring and is rotating together when the wheel assembly is rolled along a surface to be surveyed.

25 Claims, 12 Drawing Sheets

(51) Int. Cl.
*G01N 29/22* (2006.01)
*G01N 29/24* (2006.01)
*G01N 29/265* (2006.01)

(52) U.S. Cl.
CPC ....... *G01N 29/226* (2013.01); *G01N 29/2475* (2013.01); *G01N 29/2493* (2013.01); *G01N 29/265* (2013.01); *G01N 2291/0231* (2013.01); *G01N 2291/0232* (2013.01); *G01N 2291/0234* (2013.01); *G01N 2291/0237* (2013.01); *G01N 2291/106* (2013.01); *G01N 2291/2675* (2013.01)

(58) Field of Classification Search
CPC ............. G01N 29/2493; G01N 29/265; G01N 2291/0231; G01N 2291/0232; G01N 2291/0234; G01N 2291/0237; G01N 2291/106; G01N 2291/2675; G01N 2291/044

See application file for complete search history.

(56) References Cited

U.S. PATENT DOCUMENTS

| | | | |
|---|---|---|---|
| 4,640,133 | A | 2/1987 | Lecuru |
| 4,986,119 | A | 1/1991 | Gicewicz |
| 5,404,755 | A | 4/1995 | Olson |
| 6,055,862 | A | 5/2000 | Martens |
| 6,317,387 | B1 | 11/2001 | D Amaddio |
| 6,343,512 | B1 | 2/2002 | Bourne et al. |
| 6,536,553 | B1 | 3/2003 | Scanlon |
| 6,604,421 | B1 | 8/2003 | Li |
| 6,688,178 | B1 | 2/2004 | Schmidt et al. |
| 2006/0065055 | A1 | 3/2006 | Barshinger |
| 2006/0084891 | A1 | 4/2006 | Barthe et al. |
| 2008/0141778 | A1 | 6/2008 | Bosselmann et al. |
| 2010/0324423 | A1 | 12/2010 | El-aklouk et al. |
| 2012/0291555 | A1 | 11/2012 | Hackenberger |
| 2013/0047729 | A1* | 2/2013 | Wigh ................... G01N 29/043 73/636 |
| 2014/0150557 | A1 | 6/2014 | De Miguel Giraldo |
| 2015/0219602 | A1 | 8/2015 | Bond-thorley |

FOREIGN PATENT DOCUMENTS

| | | |
|---|---|---|
| EP | 0023125 A1 | 1/1981 |
| GB | 1118141 A | 6/1968 |
| GB | 1294404 A | 10/1972 |
| JP | H03269360 A | 11/1991 |
| JP | H1151917 A | 2/1999 |
| JP | 2012068230 A | 4/2012 |
| WO | 2016043596 A1 | 3/2016 |

OTHER PUBLICATIONS

Paul Regtien et al, Acoustic sensors / Chapter 9.1.4 Acoustic impedance, Acoustic sensors / Chapter 9.1.4 Acoustic impedance, 2018, 1, 2018.

PCT/ NO2017/050156, International Search Report and Written Opinion, International Search Report and Written Opinion, dated Oct. 19, 2017.

Swatch AG, Norwegian Search Report dated Dec. 16, 2016 for Norwegian patent application No. 20160998, Norwegian Search Report dated Dec. 16, 2016 for Norwegian patent application No. 20160998, dated Dec. 16, 2016, 2, 2016.

* cited by examiner

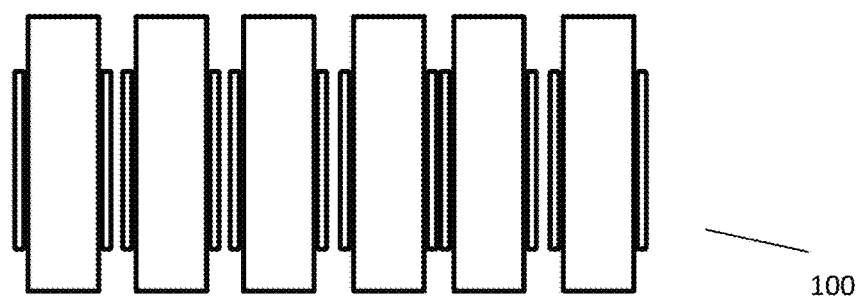
FIG. 1
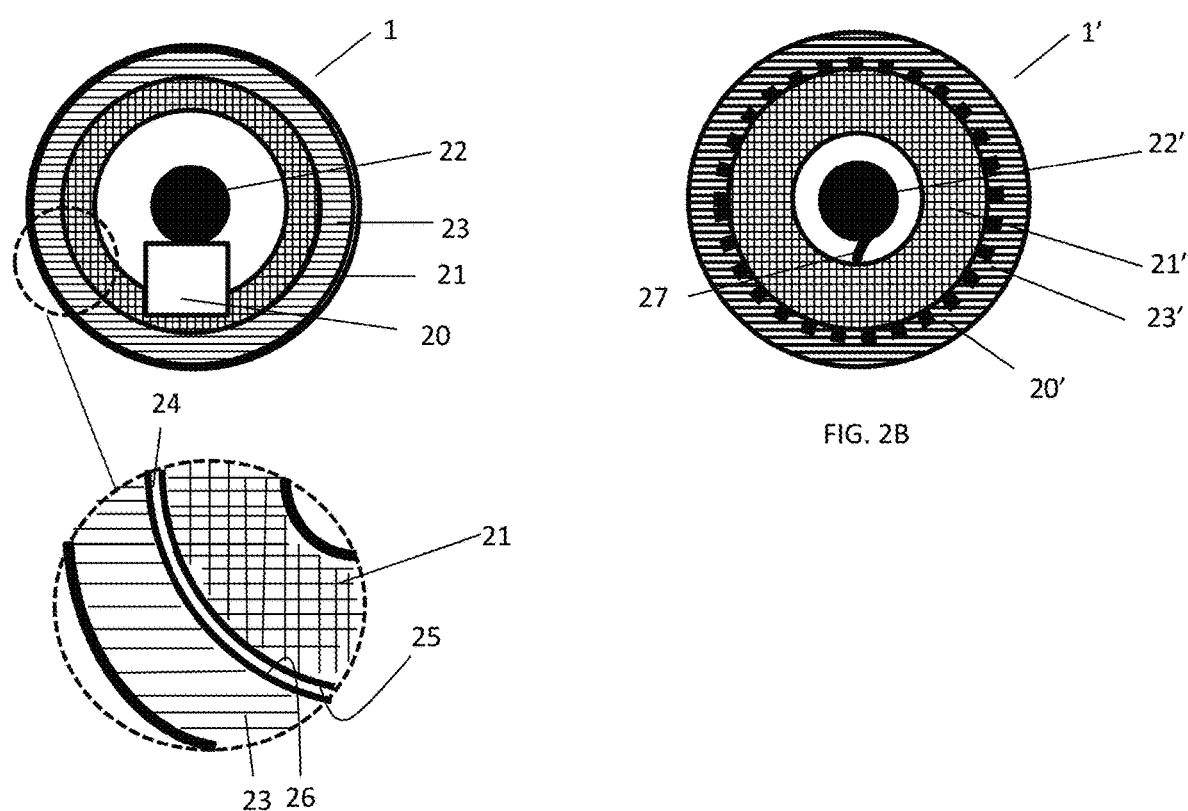
FIG. 2A
FIG. 2B

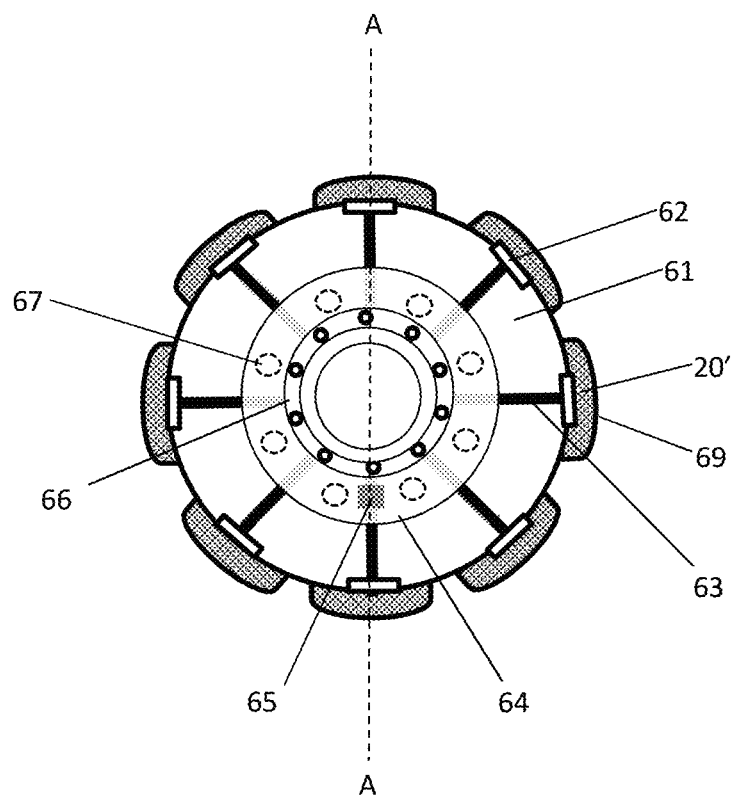
FIG. 6A
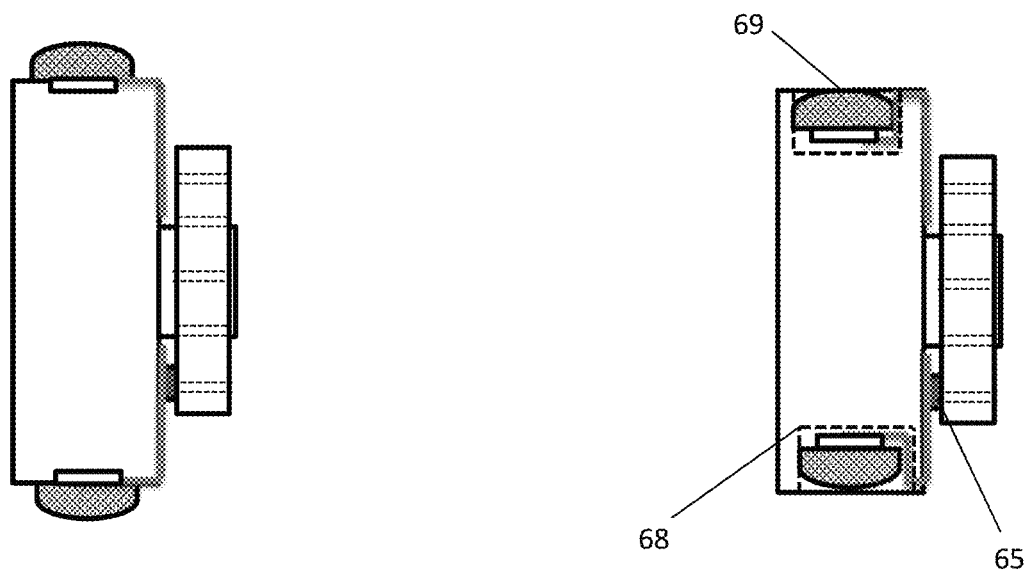
FIG. 6B
FIG. 6C

150

DEVICE, SYSTEM AND METHOD FOR EMISSION AND RECEPTION OF ULTRASONIC SIGNALS TO AND FROM A TEST MATERIAL

BACKGROUND

The present invention relates to a module based device for ultrasonic signal emission and reception of reflected ultrasonic signal enabling non-destructive analysis of solid material such as in roads, bridges, constructions, pipelines, tanks, off- and on-shore, aerospace, space and sub-sea.

It is a problem to facilitate satisfactory inspection methods and devices for collection of data for imaging of the material itself and of internal constructions, such as reinforcements, and or flaws and faults, for construction materials.

Solutions have been facilitated for inspection of installations such as pipelines, containers, railway tracks and the like to collect data and to map potential weaknesses and faults. Common for these are that the inspection tools are difficult to adapt in response to the wide variety of materials, surfaces and environments of the materials to be inspected.

It is further a problem with known solutions that the instruments are heavily dependent on using coupling fluid, either inside the instrument or both inside and outside between the instrument surface and the surface of the material to be tested. In these instances it is difficult to facilitate reliable measurements of a ground surface not offering an upward directed surface.

Problems arise also when large constructions are to be surveyed using ultrasonic signal emission and reception for imaging of the underground, since the available tools are more suitable for random sampling of small areas, or the tools are not customized for the task. The result is that the time consumption will be unacceptable high or near 100% coverage, and analysis of the construction material is not achievable.

An even further problem is that unevenness in the surface of the material being tested will cause the instrument to loose contact with the surface of the material to be tested, and hence no valid measurements are being recorded.

The present invention provides a device for emission and reception of ultrasonic signal for analysis of large constructions of test material, including test material with uneven surfaces, and ultrasonic data collection. The present invention is flexible and customizable in that it can be adapted to the topology of the surface to be surveyed, amount of simultaneous data collection requirements, low maintenance and high coverage characteristics insensitive of surface structure.

The device is suitable for use analyzing the underground at various depths, the depth range also comprising the layer ranging from the surface and up to 15-20 cm into the test material, but not excluding other further buried layers. Depending on the requirements to SN ratio of received data, frequency of transducer emitted signal and strength, rate of sampling, the depth range of the test material analysis can be varied substantially. The aim is to enable identification of weak spots and faults in the underground of the construction/test material, such as faulty or deteriorated reinforcements in a concrete construction, weak spots due to hidden branches or rotten parts in a wood construction, or other faulty parameters in such constructions or the likes. The present invention provides efficient collection of data using ultrasonic transducer technology, with the ability to utilize low frequency emission in the lower frequency ultrasound kHz range, preferably between 25 kHz and 500 kHz, or more preferably between 75 kHz and 225 kHz, for better performance in test material such as concrete and wood or the like.

The present invention may further be used for emission of ultrasonic signals in higher frequency ranges up to multi MHz range, preferably between 0.5 MHz-10 MHz. The device may also be used for ultrasonic data collection from more compact test material, such as steel, carbon fiber, glass fiber or the like.

Although some frequency ranges have been specifically discussed in this document, this shall not limit the present invention, and other frequencies may easily be chosen.

The present invention device comprising at least one wheel assembly comprising an inner backing/partial or complete orbital ring and an outer rotatable orbital ring, wherein the inner backing/orbital ring may be non-rotating, the wheel assembly further comprising one or more ultrasonic transducers for emission and/or reception of reflected signal, the wheel assembly further comprising a coupling arrangement requiring none or very little coupling fluid, and in the case coupling fluid is used it is provided as a film on the surface of the inner side of the outer orbital ring and/or the surface of the outer side of the inner ring, or in a seal tight layer between the backing/inner ring and the outer rotatable orbital ring, where the one or more transducers are arranged on or integrated in the orbital inner ring.

The wheel assembly provides in some embodiments connecting means for connecting more than one wheel assembly together in a wheel module mounted on a carriage, such as an instrument carriage.

One or more groups of connected wheel modules may be integrated in a larger group of wheel modules, wherein all transducers are controlled by a central controller, either mounted together with the larger group of wheel modules, or remotely connected via wired/wireless communication.

The wheel modules may be mounted on a custom adapted axle, or the connecting means may provide an axle function where the outer connection means of a wheel module, consisting of one or more wheel assemblies, on either side constitutes a connection point for the instrument carriage.

Each connection point, both between the wheel assemblies and between wheel module and instrument carriage may comprise electrical/signal connections via wire, slip ring contacts, wireless communication, induction contacts and other for transmission of control signals, power, survey data and similar.

The instrument carriage may comprise a motor function for moving the instrument carriage, by transferring a rotating force to one or more of the wheel modules or to a wheel assembly (not shown) dedicated for driving the carriage in a desired direction.

BRIEF DESCRIPTION OF THE DRAWINGS

The invention is further explained in the attached figures that should be interpreted as illustrations of possible embodiments of the invention, but do not represent any limitation of the scope of the invention.

FIG. 1 is a conceptual outline of a group of wheel assemblies grouped together;

FIG. 2A describes an outline of the internal of the wheel assembly in a first embodiment, also with a section highlighted;

FIG. 2B describes an outline of the internal of the wheel assembly in a second embodiment;

FIG. 6A illustrates a further embodiment of a wheel assembly;

FIGS. 6B and 6C is a cross section view of two embodiments of the wheel assembly as shown in FIG. 6A;

DETAILED DESCRIPTION

Figure 3:
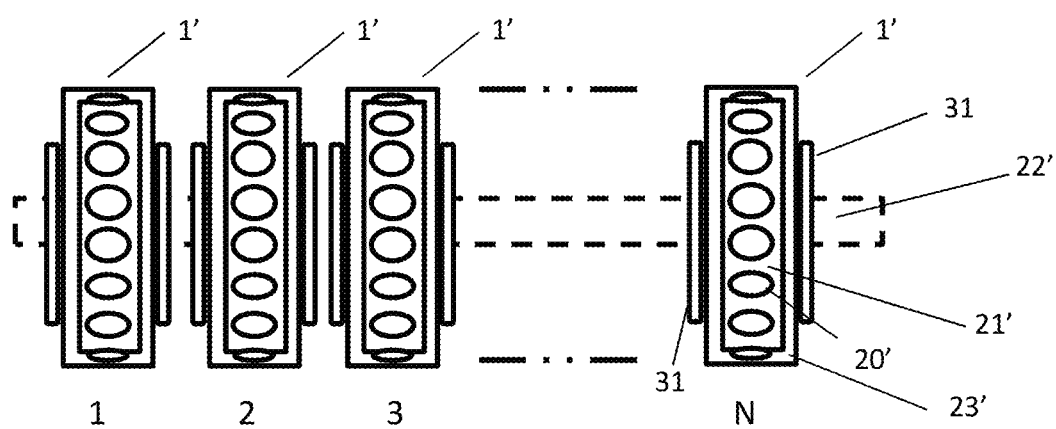
FIG. 3 illustrates a number of wheel assemblies as shown in FIG. 2A arranged with an axle function illustrated.

In a first embodiment as illustrated in FIG. 2A of the invention the wheel assembly comprises one transducer module 20, the transducer module 20 comprising one or more transducers, with backing and shaft/axle 22 that will be stationary while an outer ring/orbital outer ring 23 with a solid or viscoelastic coupling medium, such as an elastomer, is arranged radially outside the transducer module 20 with backing/orbital inner ring 21 and is rotating when the wheel assembly 1 is rolled along a surface under survey.

The transducers in the transducer module can be of any one of or combination of shapes such as: circular, square, concave, convex, single and double curved to achieve different transducer beam focus/defocus.

The one or more transducers 20 are completely or partially embedded in the orbital inner ring 21 such that the surface of the transducers 20 are in direct contact with the orbital inner ring 21. The orbital inner ring is connected to the axle 22 in the sense that it is not rotating with the orbital outer ring 23 when the wheel assembly 1 is rolled along a test surface. The interface 24 between the inward facing surface 26 of the orbital outer ring 23 and/or the outward facing surface 25 of the orbital inner ring 21 comprises a low friction material or fluid 24 having an acoustic impedance in the same order as that of the orbital outer ring 23. The low friction material 25, 26 may be one of, but not limited to a polymer or polytetrafluoroethylene (PTFE), Graphite, hexagonal boron nitride, molybdenum disulfide, tungsten disulfide, metal alloys, PVDF or strongly hydrated brush polymers. The intention is to provide a dry interfaces providing a low friction bearing or contact. The wheel 1 will in most cases be used in a slow rolling speed action, and therefore the interfaces will not generate a lot of heat, or resistance against the rotational forces. The low friction material 25, 26 may be attached to the inward facing surface 26 of the orbital outer ring 23 and/or the outward facing surface 25 of the orbital inner ring 21 as a separate layer material, or the layer material may be deposited by sputtering to the inward facing surface 26 of the orbital outer ring 23 and/or the outward facing surface 25 of the orbital inner ring 21. Other known methods for production of the layering may be applied for achieving the same result.

It is an option to use a wet interface, wherein either or both inward facing surface 26 and/or outward facing surface 25 has an applied film of a low friction fluid, or where the interface 24 between the inward facing surface 26 of the orbital outer ring 23 and/or the outward facing surface 25 is defined by a sealed off space 24 which is occupied by a low friction fluid which completely fills an enclosed space and provides a low friction bearing function. Such fluids may be selected from the low friction fluid like one of the following, but not limited to: silicon based fluid, mineral or vegetable based oil, synthetic oil, or water alone or in combination with one of the other base oils.

In a second embodiment as illustrated in FIG. 2B of the invention the wheel assembly 1' comprises a backing 21' where one or more transducers 20' are mounted on the outward facing surface of the backing 21' protruding radially from the backing 21'. A stationary shaft part 22' and a slip ring connector 27 (multifunctional) transmit signals and power to and from the transducers 20'. A solid or viscoelastic coupling medium such as an elastomer layer/orbital outer ring 23' is arranged radially outside the transducer modules 20' with backing 21' and is rotating when the wheel 1' assembly is rolled along a surface to be surveyed. In this embodiment the transduces 20', the orbital inner ring 21' and the orbital outer ring 23' rotates together when the wheel 1' 1 is rolled along a surface under survey. The orbital inner ring 21' and/or the orbital outer ring 23' may comprise one or more sensors (not shown) for detecting which part of the wheel assembly is in contact with the surface under test. The wheel may further comprise a controller (not shown) for controlling which transducer to activate, either as a transmitter or receiver or both. The controller may receive signals from the one or more sensors for detecting which part of the wheel assembly is in contact with the surface under test in order to activate only a limited number of transducers 20' which are most optimal oriented towards the surface of the material under test. The sensors detecting which part of the wheel assembly is in contact with the surface under test may be gyro based, pressure based, radar based, sonar based, conductivity based or other.

Figure 4:
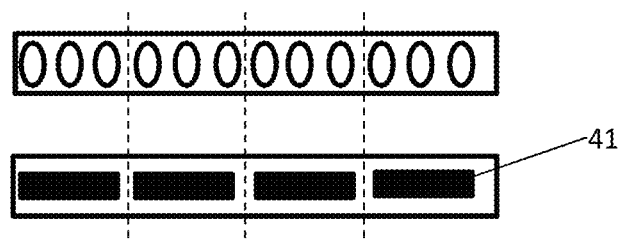
FIG. 4 illustrates the outward pointing surface of the orbital inner ring of the wheel module of FIG. 2B, and the inward pointing surface of the orbital inner ring of the wheel module of FIG. 2B respectively.

In yet another embodiment of the wheel as described in FIG. 2B, the inward facing surface of the orbital inner ring 21' may comprise a circular contact field for connection with an electrical brush connector/slip ring connector 27 to an electrical wiring being comprised in the axle. An alternative embodiment of the pattern of the circular contact field 41 is shown in FIG. 4, wherein the pattern ensures that the slip ring connector 27 is in contact with only a portion of the transducers at the same time. Each transducer is in electrical contact with the circular contact field 41 at a point radially arranged in line with the transducer position on the orbital inner ring. A portion of the transducers may be a single transducer or more, adapted to how many transducers will be able to transmit and receive signals from the material under test. The use of a patterned circular contact field may simply be to save energy by not activating a number of transducers not able to contribute with meaningful information in the information collection process. Typically only transducers pointing towards the surface of the material under test will contribute to such information collection.

The orbital outer ring 23, 23' is typically configured to have acoustic impedance in the same order as that of the test material such that as little as possible of the out signal is lost when entering the material under test. If the acoustic impedance is too different, a lot of the signal energy will be lost when transmitting from the orbital outer ring 23, 23' and into the material under test.

The material of the orbital outer ring and/or orbital inner ring may further be configured with an elasticity coefficient adapted to the unevenness of the surface of the test material. The purpose of this is to enable, when more wheels are arranged on the same axle as illustrated in FIG. 1 and FIG. 3, and an obstacle is encountered on the surface of the material under test, that only the wheels rolling over the unevenness will be affected of the unevenness. The elasticity of the orbital rings 21, 21', 23, 23' will adapt to the unevenness, and thereby only the actual wheel encountering unevenness will be affected when information is collected from the underground.

There are no limitations to the size parameters of the present invention. Any type of transducer may be used, and wheel sizes such as diameter and width is dictated by the required topography of the test material, the transducer types used for operating in the required frequency range, as well as required impedance in the material of the orbital rings.

Figure 5A:
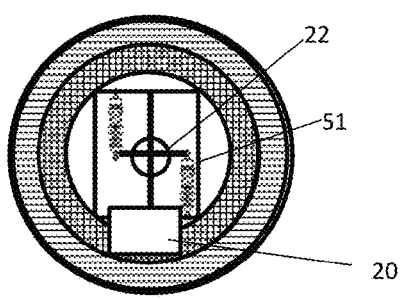
FIG. 5A illustrates a wheel module of FIG. 2A, comprising an integrated suspension feature.

A further mechanism for adapting to the unevenness of the surface of the material under test is provided in yet another embodiment of the invention wherein a suspension feature 51 is integrated in the wheel assembly. In FIG. 5A this is pictured in a wheel configuration as shown in FIG. 2A. Other integrated suspension mechanisms may be used. The independency of the suspension feature 51 adapted to the individual wheel 1, 1' provides a further improved characteristics for a system insensitive to obstacles in the path of the wheel modules. Letting the obstacle be avoided by a suspension device 51 instead of the more elastic material of the wheels as discussed above may improve the acoustic capabilities of the wheels. Even if one or more wheels may be disabled because of being lifted from the ground by an obstacle, the rest of the wheels being in contact with the surface of the material under test 15 will have an acceptable contact and signal response ratio. The latter suspension mechanism may be used to reduce limitation of material impedance compared with material under test as a result of a trade-off due to requirements to elasticity to enable testing rough test material.

Figure 5B:
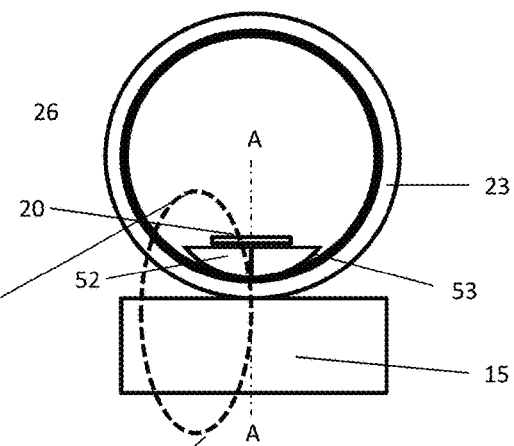
FIG. 5B illustrates a wheel assembly having a partial inner ring having a smaller diameter than inner diameter of outer ring.
Figure 5C:
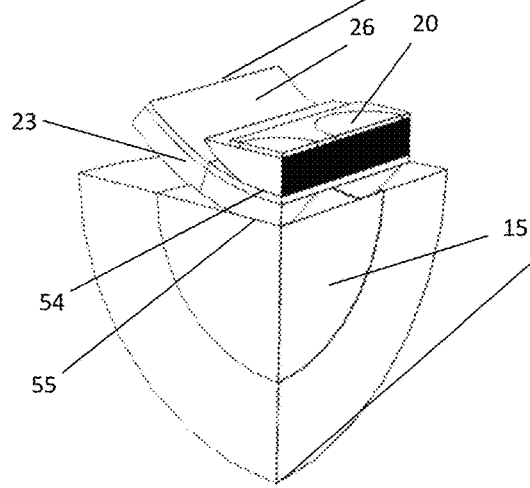
FIG. 5C shows an oblique view of a section of the wheel arrangement in 5B.

The wheel assembly may be comprised of a partial inner ring 52 having a smaller diameter than the inner diameter of the outer ring 23, 26 as described in FIGS. 5B and 5C. The partial inner ring 52 may just be a fraction of a ring. The transducer 20 may be attached to the inside of the partial inner ring 52 or may be fully or partially embedded in the partial inner ring 52. The smaller outer diameter of the partial inner ring 52 controls the area 54 of contact between the partial inner ring and the inside of the outer ring 23, 26. The present invention comprise alternative embodiments of the transducer(s) 20 and the coupling medium/partial inner ring 52 of different forms than the fraction of an inner ring, for example a cylinder, spherical or coned form presenting a defined contact/coupling area between the coupling medium/partial inner ring 52 and the inside 26 of the outer ring 23.

Figure 5D:
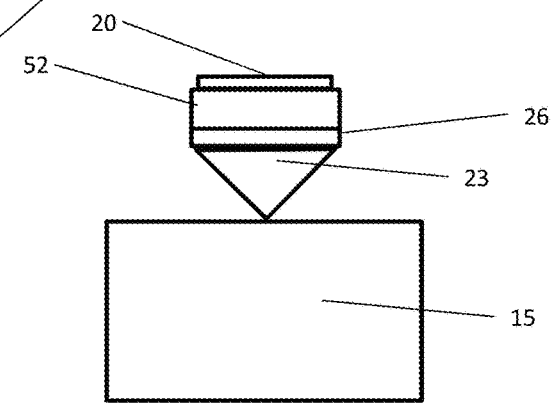
FIG. 5D shows a cross section (A-A 5B) side view of the lower part of the wheel assembly and the test material, one transducer.

The shape of the orbital outer ring 23 may be provided in a form ideal for transmitting the acoustic signals from the transducers 20 to the material under test 15, including but not limited to round, rectangle, coned, or pyramid shaped as illustrated in FIG. 5D.

The material, design and contact areas in the interfaces between the transducers 20 and the partial inner ring 52, between the partial inner ring 52 and the inside of the outer ring 23, 26, and between the outer ring 23 and the material under test 15 defines the acoustic fields in the material under test 15 emitted from the transducers.

The coupling medium/partial inner ring 52 and the outer ring 23, 26 may be suspended in a similar way as discussed above, wherein the suspension feature 51 is coupled to the outer ring 23, 26, and the wheel assembly holds the transducer 20 and the coupling medium/the partial inner ring 52 at a constant radial position directed towards the material under test 15 whilst the outer ring 23, 26 rotates as the wheel assembly is moved along the surface of the material under test 15. Each wheel assembly of an instrument rig may be individually suspended, such that contact to the surface is maximized irrespective of unevenness in the surface of the material under test 15.

The two contact areas, being comprised of the interface between the inside 26 of the outer ring and the outside of the coupling medium/outside of the partial inner ring 52, and the outside of the outer ring 23 and the test material 15, may present different acoustic properties varying with the area of the contact interfaces, the material of the outer ring 23 and the coupling medium/the partial inner ring 52. Smaller contact areas give larger spread of the emitted signal from the transducer 20. The requirement to acoustic spread may be governed by the state of the surface of the material under test 15. A smooth surface of the test material 15, may allow for wider contact area of the contact interfaces. FIG. 5D illustrates a coned form of the interface between the outer ring 23 and the material under test 15.

The inside 26 of the outer ring and/or the outside of the coupling medium/outside of the partial inner ring 52 may comprise a lubricating formula, or be of a low friction dry material having required acoustic properties. Such material may for example be ROBALON®, or any type of polymer or polytetrafluoroethylene (PTFE), graphite, hexagonal boron nitride, molybdenum disulfide, tungsten disulfide, metal alloys, PVDF or strongly hydrated brush polymers, or others. The acoustic properties of the wheel assembly should be adapted to the composition of the test material 15.

Using low friction dry materials in the interface 54 between the transducer 20, the coupling medium/the partial inner ring 52 and the outer ring 23, 26 enables adequate signal transmission through the wheel assembly into the material under test 15 without requiring any coupling fluid, and hence no need for advanced sealing features to hold the coupling fluid.

The construction of the test instruments can therefore be made much lighter and compact, with a simpler design that is easier to mount and dismount, and parts and materials of the wheel assembly and transducers may be altered to fit the material to be inspected 15 more readily.

A further example of a wheel assembly is shown in FIGS. 6A, and 6B and 6C. The transducers 20' are mounted radially partially or completely embedded in a single orbital ring 61, wherein the transducer outer surface represents the orbital outer ring as discussed in the above embodiments. The latter embodiment facilitates for a simpler implementation of production and adding the signal and electrical cabling 63 and contact pads 62, and a slip ring contact 65. The wheel may further be implemented without an axle and attached to a bearing wheel 64 via for example a ball bearing unit 66. The bearing wheel 64 may further have connecting means 67, such as bolt conduits for fastening to a chassis or a second wheel assembly.

In a further embodiment the wheel assembly may have recesses 68 for each transducer 20', which completely "buries" the transducer 20' into the single orbital ring 61, The transducer comprising an outer "capsule" 69 having an endurable material with a known acoustic impedance and such present an even outer surface and constitute the orbital outer ring 23'.

The transducers may have a physical form such that when mounted around the wheel assembly they will touch the neighbour transducer on both sides, and thus represent a continuous track.

Figure 7:
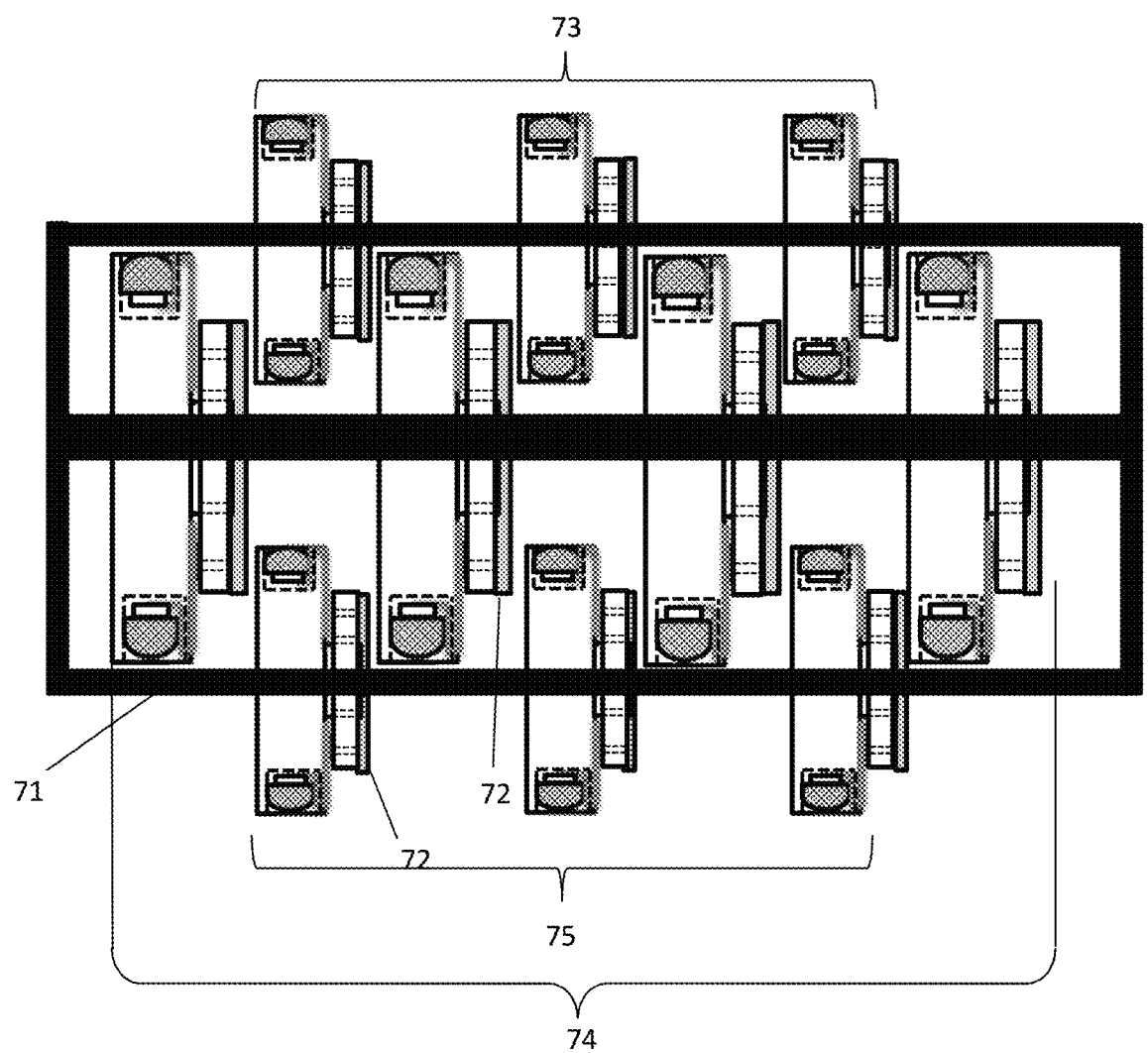
FIG. 7 is a layout view of multiple wheel assemblies of different characteristics for broader depth range survey.

A wide variety of survey tasks ranging from detecting corrosion areas on steel plates, pipes and structures, detecting cracks, flaws and detecting voids and delamination in composite materials, for example Carbone sheets or frames, or even woven fiberglass and glass reinforced plastic as used in light weight boat and airplane constructions. Often there is a need to test/survey a broader depth range than possible with traditional instrumenting. The present invention provides a solution to this in that the design of the wheel assemblies can be very flexibly arranged in modules of single wheel assembly to a multiple wheel assemblies arranged in an array mounted on an axle or on individual adapted frame connection arrangements. Such an embodiment is indicated in FIG. 7, where wheel assemblies of the type discussed in FIG. 6 is individually arranged on corresponding ball bearing connectors 72 to a frame 71, the wheels being arranged as three modules 73, 74, 75 having different wheel characteristics, and thus enabling a survey that can span several depth ranges simultaneously.

Figure 14:
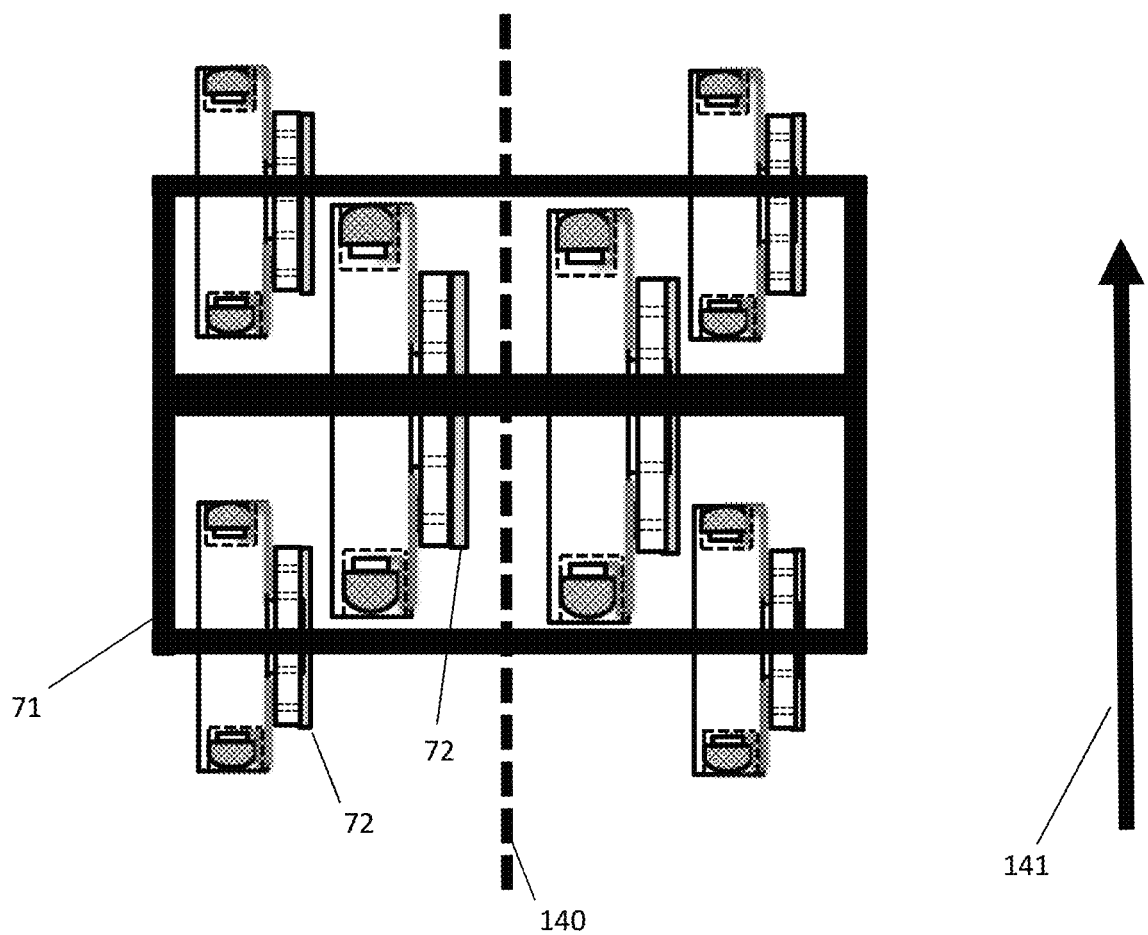
FIG. 14 is a diagram showing directional wave used in combination with different impedance materials in wheel and material under test.

Typically, for controlling a welding seam 140, present invention would be arranged with a number of wheel assemblies arranged perpendicularly on each side of the welding seam 140 as described in FIG. 14, and rolled in a direction 141 along the path of the welding seam 140. Depending on number of wheels and individual characteristic of the wheel assemblies it is possible to cover a wide depth range analysis.

The transducer design will also contribute to the total characteristic of the wheel assemblies. The higher the frequency and diameter of the transducers the narrower the beam angle is, and the more directional can the sound beam be controlled. In the opposite range, for wide beam requirements surveying the near surface area, it is desirable to operate with larger spread, hence lower diameter and lower frequency will achieve this.

Figure 8:
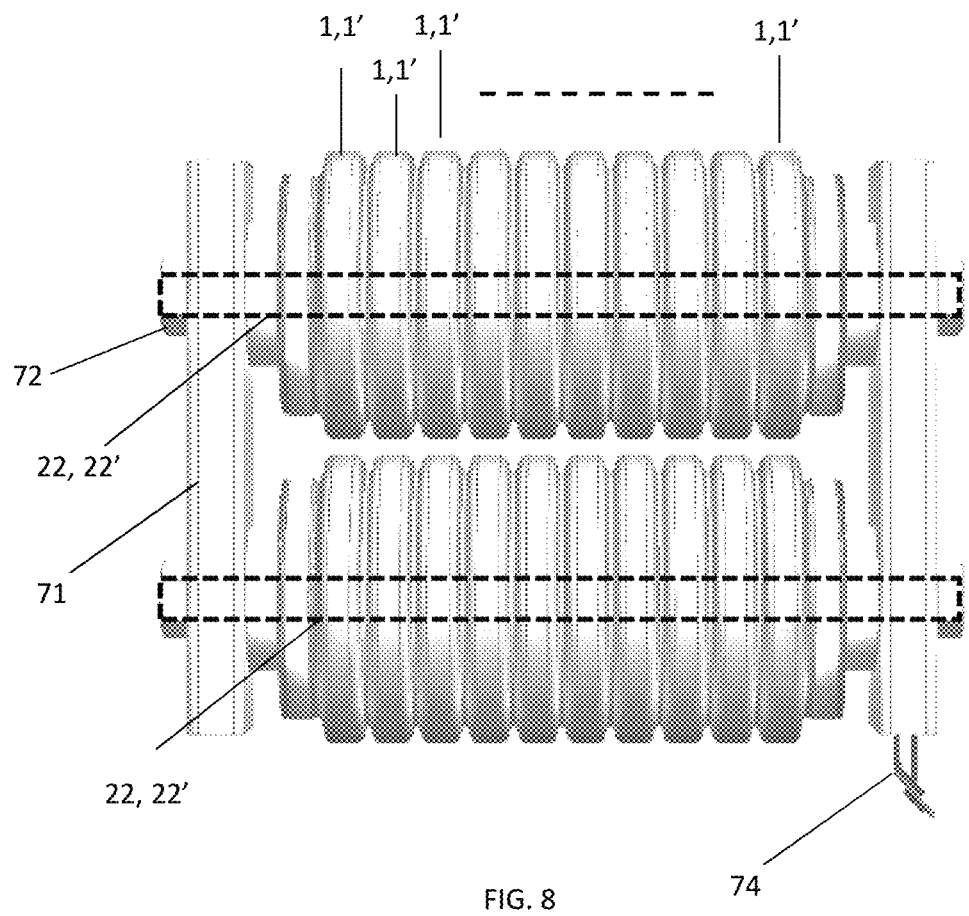
FIG. 8 is a top view of a two roller unit.
Figure 9:
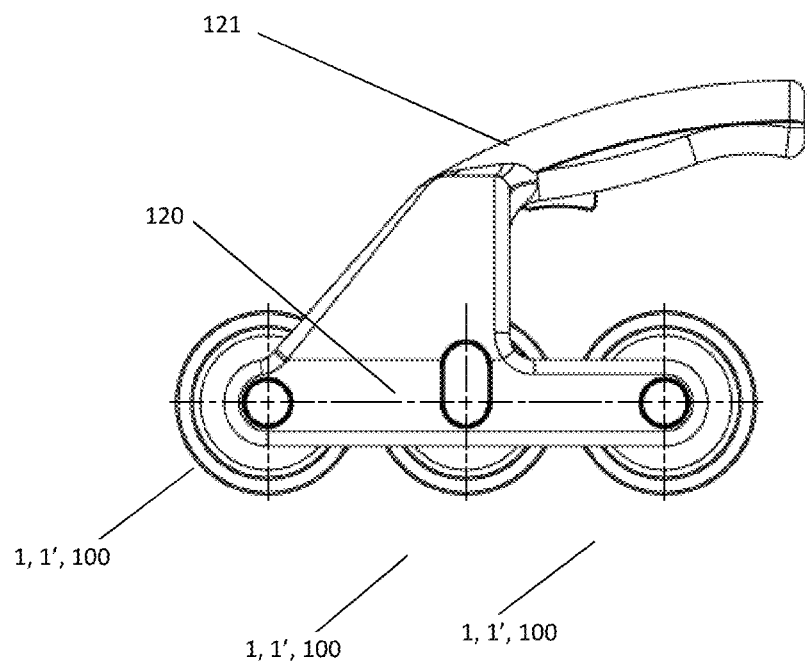
FIG. 9 is a side view of a handheld three roller unit.
Figure 10:
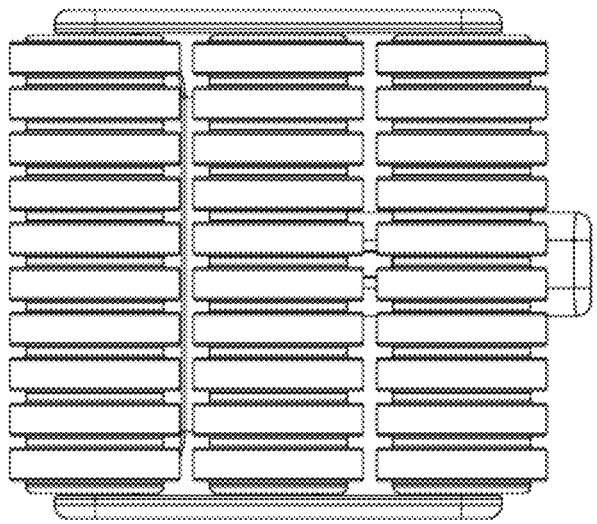
FIG. 10 is a bottom view of a handheld three roller unit.
Figure 11:
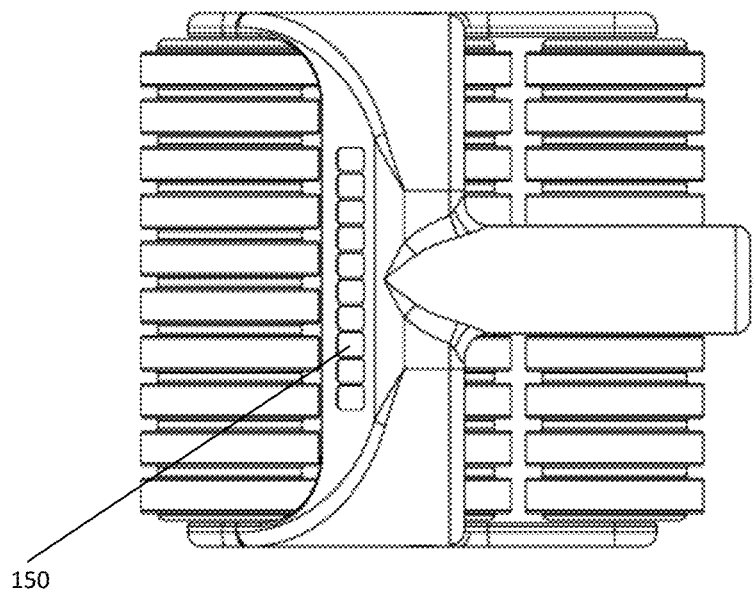
FIG. 11 is a top view of a handheld three roller unit.
Figure 12:
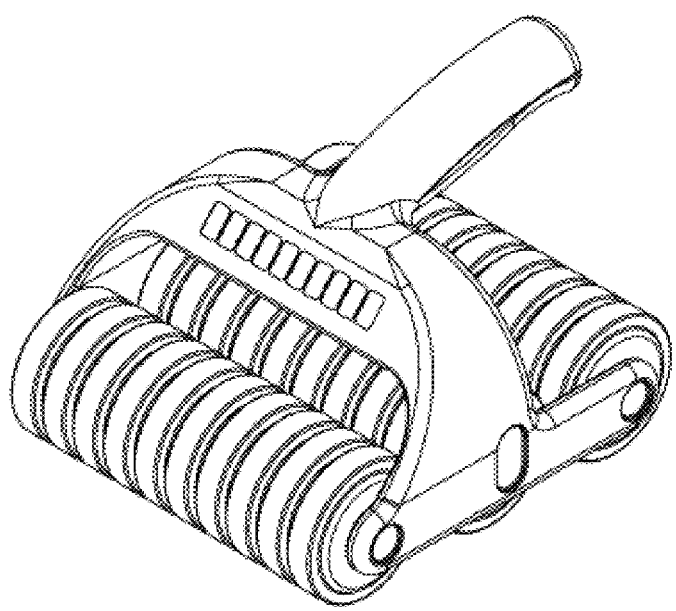
FIG. 12 is a perspective top front view of a handheld three roller unit.

Different wave guiding characteristics may also be used, such as shear waves and FIG. 8 illustrates how two arrays of wheel assemblies constituting two wheel modules arranged on two axles 22, 22' coupled to a frame element 71.

One or more wheel assemblies 1, 1' of the invention described above may be mounted in a frame 70 as shown in FIG. 7-8. FIG. 8 show how two wheel modules 1, 1', 100 are mounted in brackets/frame 71. The signaling cables 74 are lead through the frame 70.

Another embodiment of the invention is illustrated in FIG. 9-12 showing three wheel modules 1, 1', 100 of the innovation mounted in a handheld frame 120, where a handle 121 is mounted to the frame 120. The handheld device of the invention may be operated to store received signals together with positional information calculated out from a predefined starting pint by registering the movement over the test material by the rolling motion of the wheels of the invention or other mechanisms such as for example a computer mouse device (not show) or infrared measuring means or the like (not shown).

The handheld device may have on board or attachable, via cable, induction or wireless communication access to: energy source, memory, control logic, input and output control ports, display and audio.

Indication lights 150 may be arranged on the frame for purposes such as indicating contact status between the device and the test material, alarm status if preset signal pattern is received, or if received signal in a specific position is not valid.

Indication lights may be color-coded, such as for example red light if no contact or green light when contact is detected between the device and test material. Other colors and switching pattern may be use for different purposes. One such purpose may be as a self-test indicator to be run prior to each job. It is also possible to use lights in a calibration routine where for example the device may be rolled over a known test material with a known surface with a known expected test result when transducers emit signals in line with a preset test pattern and frequencies. If expected received signal is verified the device is cleared for operation. Verified device may be identified by a preset light pattern displayed by the indication lights 150.

A connected computer may also be used for purposes of storing, calibration, test and evaluation of test results. Computer may be connected by cable, wireless communication or by transfer of data via a storage memory device. A storage memory device may be detachably mounted to the electronic circuits in the device, or may be connectable via an interface at the time of transfer operation.

Figure 13A:
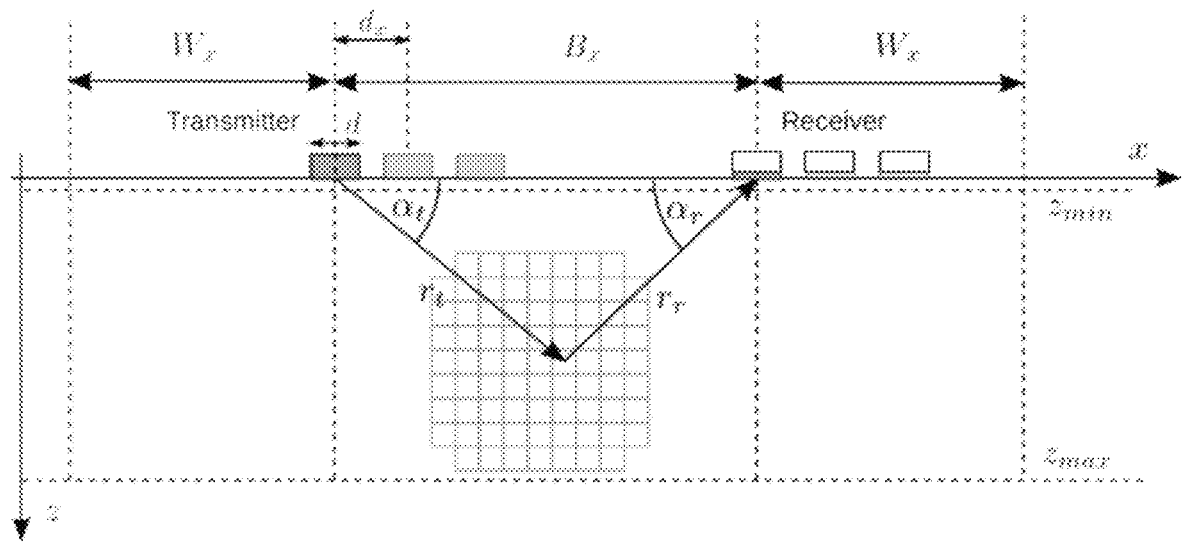
FIGS. 13A and B is diagrams showing along-track and cross-track geometry example of emitting and receiving arrays of transducers.
Figure 13B:
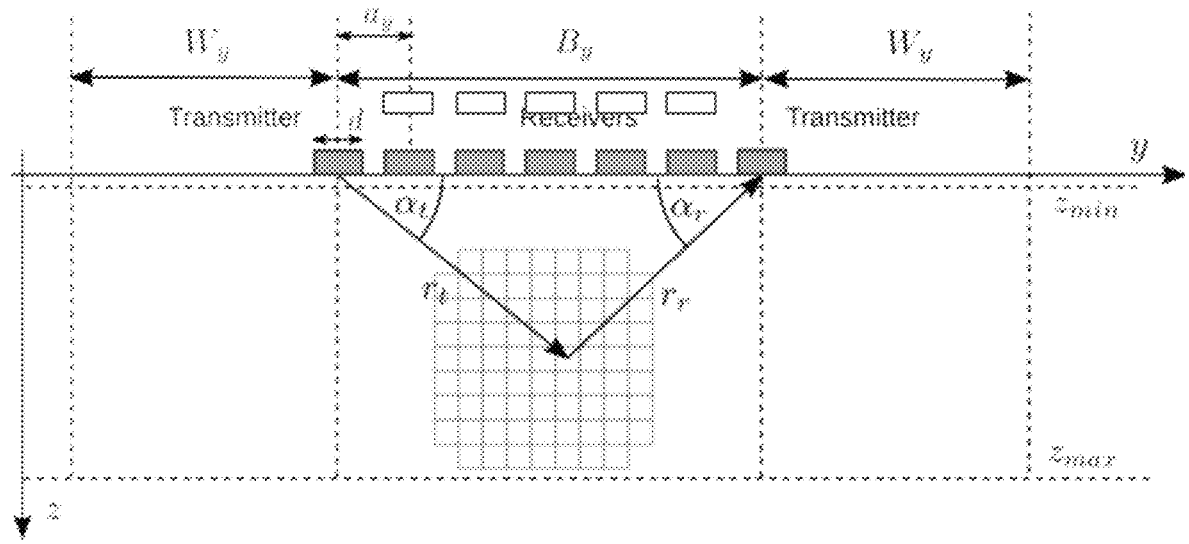

The array of transducers may be used in different modes. Two different modes are shown in FIGS. 13A and 13B. Other modes can be utilized.

In FIG. 13A, it is shown a mode for along-track inspection. One array of transducers, e.g. the trailing wheel modules 1, 1', 100 of the invention, are used for emitting signals into the underground of the test material, and one array of transducers, e.g. the leading wheel modules 1, 1', 100 of the invention is used as receiving means for receiving the emitted signals that has traveled into and through the test material and reflected from this.

In FIG. 13B, it is shown a mode for cross-track inspection. This is achieved by allocating a number of transducers in one array of transducers for emitting the ultrasonic signal, and a number of transducers of the same array of transducers to receive the signal when reflected from the test material. One transducer may both emit and receive. In one scenario a transducer in the peripheral section of the array of transducers is emitting signals into the underground of the test material and one or more transducers in the mid-section of the array of transducers receives the reflected signals.

It is possible to use more than one array of transducers for receiving, i.e. for the handheld device described above: A transducer in the trailing array of transducers may emit, whilst the two leading arrays of transducers receive, or even all arrays of transducers may be set up to be receiving arrays of transducers were one or more arrays of transducers also emit.

One likely configuration in a system comprising 3 arrays of transducers/wheel modules 1, 1', 100 such as in the handheld example above is to use the transducers in the middle array of transducers for emission of ultrasonic signals, and the two outer arrays of transducers/wheel modules 1, 1', 100 for receiving the reflected signal from the test material.

It is also possible to use a single wheel modules 1, 1', 100 1 of the invention, utilizing the cross-track geometry described above.

Transducers may be used for emission or reception only, and both emission and reception, of ultrasonic signals and reflections. A transducer serving as both emitting and receiving transducer for the same ultrasonic signal, i.e. the transducer emit an ultrasonic signal and then wait for the reflections of the signal and then receive the reflected signal, will only receive and detect reflections from objects or the like or material in the path of the emitted signal. If the object is a small vertical crack below the transducer, the reflected signal may be very weak and difficult to detect. In the present invention will a set of transducers, where each transducer either emit or receive an ultrasonic signal, not only measure reflected signals, but also measure the signal transmitted through the test material, and thus be able to measure the lack of reflection, or for example the time-of-flight diffraction. These types of measurements will provide for better S/N ratio in the measurement data. Such configuration will be able to detect the omission of a reflected signal. For example if the signal is obstructed by an air pocket in the test material, and thus the signal propagation is severely obstructed, the receiving transducer will detect that the signal is not received as expected, and a conclusion may then indicate that there is a blocking medium between the emitting and receiving transducer, such as a crack, hole, non-relaying medium or other.

The above additional ability to detect omission of a reflection may be utilized by a single wheel transducer setup of the invention as explained for FIG. 13B above. Enhancing the analyzing effect further may be achieved with the present invention by combining the feature explained in FIG. 13B with the features of using more than one wheel module 1, 1', 100 as, one example of which is explained for the transducer setup in FIG. 13A above. In relation to cracks, obstructions and air pockets, the different transducer setups may be optimized further to detect along track oriented cracks, air pockets, obstructions, with the cross track inspection feature as explained for FIG. 13B above, or across track oriented cracks, air pockets, obstructions, with the along track inspection feature as explained for FIG. 13A.

In one embodiment of the invention, the invention may be used to find welding flaws, and delamination/air pockets in sandwich structures, such as used in ships or wings (planes, wind turbines). Such sandwich structures may be constructed of multiple layers of different materials. All with potentially different response features relative ultrasonic signals of specific frequencies. The present invention may be controlled in a manner to optimize the response at the specific depth of the test material where a specific sandwich layer interface is located. One could for example examine the interface between the innermost glass fiber layer and the core material in a 3 layer construction comprising an inner glass fiber layer, an outer glass fiber layer and a core polystyrene layer. Other materials and other number of layers may be used.

Another example of embodiment is to use the invention to detect detachments/air pockets under building tiles, such as in a bathroom floor, where the outer layer is ceramic, and the inner layer is of concrete or wood, possibly with a water tight membrane structure in between.

Figure 17:
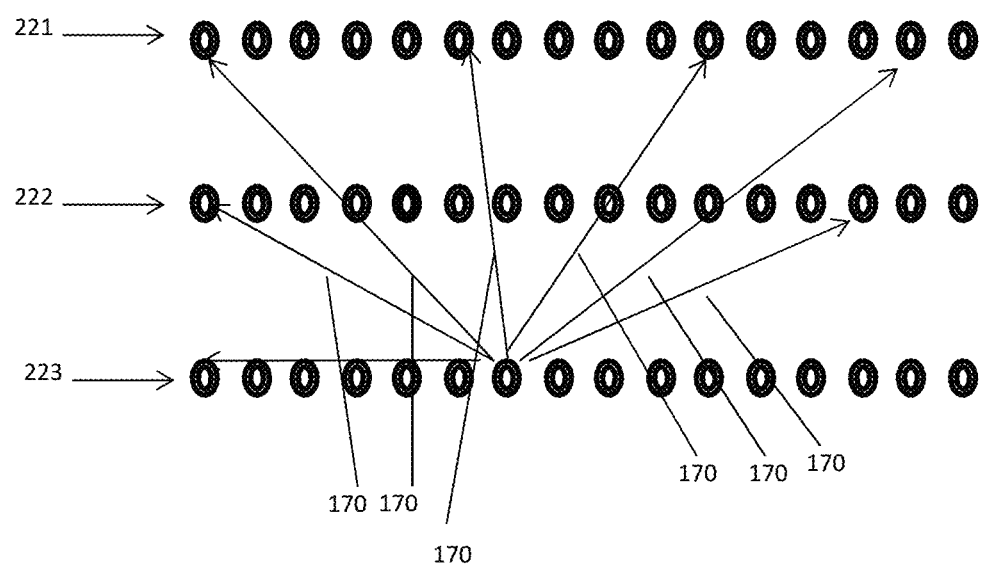
FIG. 17 is a diagram showing one emitting transducer and seven receiving transducers.

It is also possible to maximize detection capability by executing a regime of emission and reception of reflected signal where a more complex pattern of shifting the feature of each individual transducer dynamically as the ultrasonic data collection is performed. One pattern would be to let each transducer in turn act as the sole emitting source of a ultrasonic signal, and let all transducer of all wheels (if more than one) be receiving the emitted signal. This way it is possible to map the underground in many directions from perpendicular the motion direction to both sides of the emitting transducer. One example outlining one emitting transducer and 7 receiving transducers indicated by arrows 170 is indicated in FIG. 17. Here three arrays 221, 222, 223 wheel modules 1, 1', 100 of transducers are used. All other combinations may be used from 1 emitting and 1 to 48 (48 is not a limitation but the number used in the FIG. 17) receiving. Other transducer combinations may be used.

One possible regime of pattern is to let all transducers in turn be the emitting transducer, and let all transducers act as receivers for all the reflections of an emitted signal. This way it is possible to map all test material from all angles, sideways, forwards, backwards, angled in all directions and directly below. Using the motion of the device of the invention as another parameter it is possible to make several such measurements when moving over the test material. For example an air pocket in the concrete would then be thoroughly exploited from many directions several times, and no "hidden" weaknesses will be omitted.

A different regime is to allocate one or more wheel modules as transmitting transducers, and other wheel modules as receiving transducers, and then activate several transmitting transducers simultaneously, and receive all reflected signals with the remaining transducers operating in receiving mode.

There are no limits to the size of the arrays of transducers or the wheels used.

The transducers may be selected for being used with multiple and variable frequencies.

Examples of execution regimes may include, but is not limited to, different beam-forming techniques. One example of an execution regime may be SAFT (Synthetic Aperture Focusing Technique).

The more detection data that is collected, the better S/N ratio will be possible to achieve in the analysis process when data is analyzed.

Analysis of the data received from the test material may provide for the compilation of detailed 2D and/or 3D images of the test material at various depths below the surface of the test material, typically 0-15 cm below the surface of the test material.

Figure 15:
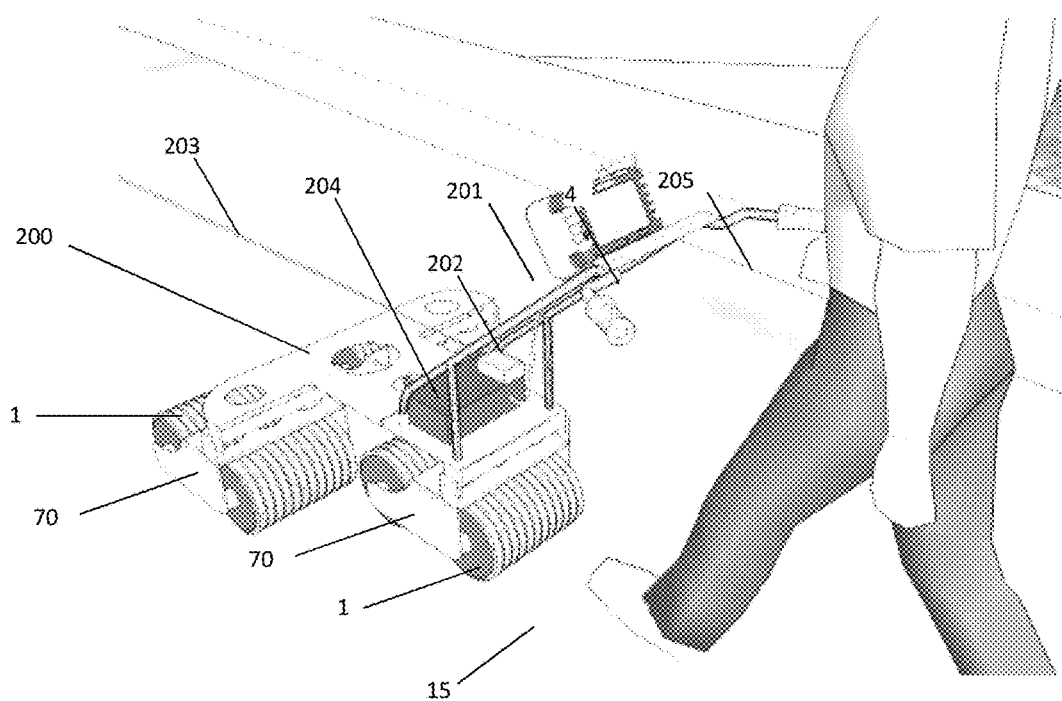
FIG. 15 is a mobile triple two roller carriage system.

FIG. 15 show a system where three pairs of wheel modules 1, 1', 100 of the invention is combined to provide a system for inspection of large volumes of test material. Each pair of wheel modules 1, 1', 100 is mounted to an individual bracket 70, and the three brackets are mounted to a carriage 200. The carriage further comprises a computing/controlling means 204, a laser measuring device 202, and a display unit 201. Each pair of wheels are individually adapting to the surface, as each section 12 of each wheel is individually adapting to the surface.

The device in FIG. 15, or any variations of a device of the invention, may have on board or attachable, via cable, induction or wireless communication access to: energy source, data storage, control logic, input and output control ports, display and audio.

Indication lights as described for the handheld device above (not shown in FIG. 16) may be comprised in this system as well as in all versions of embodiments of the invention, and for the same purposes as discussed above.

The carriage may comprise means for driving the carriage, e.g. an electromotor (not shown), remote controller features, and further comprise energy source or sources, handles 205 for manually pushing and/or steering the carriage and means for wireless communication with an external control unit (not shown).

Figure 16:
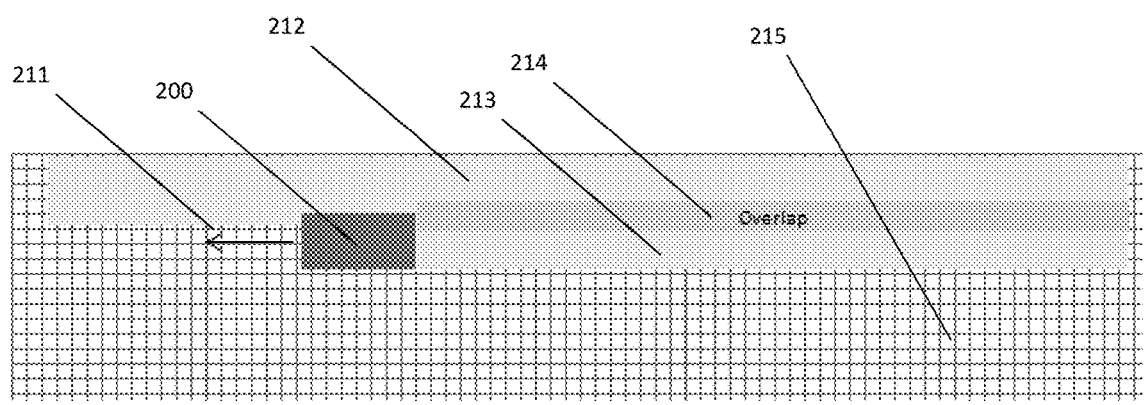
FIG. 16 is an overview of a tracking path scenario for the mobile carriage.

The control unit may be preprogrammed to guide the carriage to cover all segments of the test material as illustrated in FIG. 16. Here a real life representation show the carriage position 200, the direction of movement 211, and the areas that have 212, 213, 214/have not yet 215 been inspected. It may even be possible to distinguish between previous track of inspection 212, current track of inspection 213, and the overlap 214 of current track 213 of inspection relative to the previous 212 track of inspection.

By comparing the received data and the analysis result of this with the corresponding previously performed inspection, it is possible to detect changes in the underground of the test material. For example it may be possible to follow the deterioration of the reinforcement bar in a concrete bridge, and initiate corrective actions at an early stage of deterioration.

The laser unit may be used for measurement of distance in order to define the carriage position on the test material.

Another embodiment example is to use a device of the present invention to sample a painted steel construction. The present invention is able to collect samples of reflected ultrasonic signals that enable the data analysis to uncover cracks and defects in an unparalleled manner without the need to remove paint or other protection layer fixed to the surface of the steel construction.

Using the ability to compose an instrument having wheel modules 1, 1', 100 with different characteristics may detect flaws and irregularities on a much wider depth range on any material, or combination of material, wherein the different wheel modules 1, 1', 100 may be optimized for use on a specific lever of the test material, whether if that is a thickness measurement of a pipe, deterioration of a hull or tank, a bridge road armoring, a plane wing, radio mast bracket welding or other.

Although the examples given above is directed towards instruments used above ground, it shall be understood that the invention can be adapted to be used in sub-sea environments, wherein the instruments are mounted on for example an ROV to inspect sub s a installations, pipelines, and the like.

Although the examples given above is directed towards instruments used on the ground, it shall be understood that the invention can be adapted to be used in aerospace and space environments, wherein the instruments are arranged to inspect for example space installations, and air planes.

The invention is further defined by the following device embodiments wherein the invention in a first device embodiment comprising a device for emission and reception of ultrasonic signal to and from a test material 15, the device comprising a stationary shaft part 22', two or more wheel assemblies 1' attachable to the stationary shaft part 22', wherein each wheel assembly 1' comprises an orbital inner ring/backing 21', an orbital outer ring 23', one or more transducers 20' mounted on the outward facing surface of the orbital inner ring (21') protruding radially from the orbital inner ring 21'; the orbital outer ring 23' being arranged radially outside the transducer modules 20' with the orbital inner ring 21' and is rotating together when the wheel 1' assembly is rolled along a surface to be surveyed.

In a second device embodiment of the invention the device according to the first device embodiment is provided, wherein the device further comprises a slip ring connector 27 for transmitting signals and power to and from the transducers 20', and a controller for controlling which transducer (20') to activate, either as a transmitter or receiver or both.

In a third device embodiment of the invention the device according to any of the first to second device embodiments is provided, wherein the low friction material is one of ROBALON®, any type of polymer or polytetrafluoroethylene PTFE, graphite, hexagonal boron nitride, molybdenum disulfide, tungsten disulfide, metal alloys, PVDF or strongly hydrated brush polymers.

In a fourth device embodiment of the invention the device according to any of the first to third device embodiments is provided, wherein the transducers 20' has one of or combination of shapes such as: circular, square, concave, convex, single and double curved to achieve different transducer beam focus/defocus.

In a fifth device embodiment of the invention the device according to any of the first to fourth device embodiments is provided, wherein one or more wheels are arranged on the axle 22'.

In an eight device embodiment of the invention the device according to any of the first to seventh previous device embodiments is provided, wherein the orbital outer ring 23' is constructed of a material with acoustic impedance in the same order as that of the test material.

In a ninth device embodiment of the invention the device according to any of the first to eight previous device embodiments is provided, further comprising a controller for controlling the signals to and from the transducers.

In a tenth device embodiment of the invention the device according to any of the first to ninth previous device embodiments is provided, further comprising communication means for communicating control signals to and from the transducers.

In an eleventh device embodiment of the invention the device according to any of the first to tenth device embodiments is provided, wherein the one or more transducers 20' are electrically connected to a power source.

In a twelfth device embodiment of the invention the device according to any of the first to eleventh device embodiments is provided, wherein the wheel assemblies have on one or both sides of the rotating orbital outer ring 23' a coupling means 31, 67 for connection to a neighbour wheel assembly 1 or frame 71, 72.

In a thirteenth device embodiment of the invention the device according to the twelfth device embodiment is provided, wherein the coupling means 31, 67 further comprise connectors for transferring electrical power and/or signals between the wheels, or between the wheels and a frame.

In a fourteenth device embodiment of the invention the device according to any of the first to thirteenth device embodiments is provided, wherein one or both peripheral ends of the axle 22' have attachment means 72 for attaching the device to a frame 71, 120.

In a fifteenth device embodiment of the invention the device according to any of the first to fourteenth device embodiments is provided, wherein the device comprises means for wireless transmission of control data and received signal data.

In a sixteenth device embodiment of the invention the device according to any of the first to fifteenth device embodiments is provided, wherein each individual transducer 20' acts as either emitting transducer, or receiving transducer, or both emitting and receiving transducer.

In a seventeenth device embodiment of the invention a device module for ultrasonic signal emission and reception of reflected ultrasonic signal from a test material 15 is provided, the device comprise two or more wheel modules 100, each wheel modules 100 comprising one or more wheel assemblies 1, as described in any of the first to sixteenth device embodiments, where the wheel modules 100 are attached to a frame 71, 120.

The invention is further defined by the following system embodiments wherein the invention in a first system embodiment of the invention of a system for ultrasonic signal emission and reception of ultrasonic signal, the system comprising: one or a plurality of device/wheels according to any of the first to sixteenth device embodiments, the system further comprise a carriage 120, 200 to which the one or a plurality of wheel assemblies 1 are mounted, a control mechanism for steering the carriage along a path 211 over the surface of a test material 15, control logic 204 for controlling the carriage, the transducers, and storing and communication of data.

In a second system embodiment of the invention the system according to the first system embodiment, further comprises navigation means 202 for providing absolute position.

In a third system embodiment of the invention the system according to any of the first or second system embodiment, further comprises display means 150, 201.

In a fourth system embodiment of the invention according to any of the first to third system embodiment, the system further comprises tracking means for providing relative position.

In a fifth system embodiment of the invention according to any of the first to fourth system embodiment, wherein the carriage is a remote operated vehicle, ROV, such as an underwater ROV for subsea operations.

In a sixth system embodiment of the invention according to any of the first to fourth system embodiment, the control mechanism for steering the carriage is a handle 121, 205 for manual guidance or a remote controlled motor connected to driving means for moving the carriage.

In a seventh system embodiment of the invention according to any of the first to sixth system embodiment, the system further comprises computer means for receiving the received ultrasonic signal data and for processing the data.

In an eighth system embodiment of the invention according to the seventh system embodiment, the computer means are remote computer means.

The invention is further defined by the following method embodiments wherein the invention in a first method embodiment of the invention comprising a method for emitting and receiving of ultrasonic signal for enabling analysis of a test material 15, the method further comprises the step of: providing one or a plurality of systems according to any of the first to eighth system embodiment; emitting ultrasonic signals from one or more transducers 20'; receiving reflections of the emitted ultrasonic signals from the test material 15 with one or more transducers 20'; storing and transferring the received ultrasonic signals to a computer means and analysing the received ultrasonic signals.

In a second method embodiment according to the first method embodiment of the invention is provided, wherein the method further comprising the step of: moving the carriage 120, 200 along a predefined path 211; emitting ultrasonic signals from individual transducers 20' according to a predefined emission pattern; receiving the reflected ultrasonic signal from the test material 15 with one or a plurality of transducers configured to be receiving transducers for the individual emitted ultrasonic signal.

In a third method embodiment according to the first or second method embodiment of the invention is provided, wherein the method further comprises to compare the result of the analysis of a section of a test material with a previous analysis of the same section of the test material, and to identify changes in the test material.

What is claimed is:

1. A device for emission and reception of ultrasonic signal to and from a surface under survey, the device comprises:
    a stationary shaft part; and
    two or more wheel assemblies attachable to a stationary shaft part, wherein each wheel assembly comprises:
        an orbital inner ring;
        an orbital outer ring; and
        one or more transducers mounted on the outward facing surface of the orbital inner ring protruding radially from the orbital inner ring;
    wherein, the orbital outer ring being arranged radially outside the transducer modules with the orbital inner ring and is rotating together when the wheel assembly is rolled along a surface to be surveyed.

2. The device according to claim 1, the device further comprises:
    a slip ring connector for transmitting signals and power to and from the transducers; and
    a controller for controlling which transducer to activate, either as a transmitter or receiver or both.

3. The device according to claim 1, the device further comprises one or more sensors for detecting which part is in contact with the surface under survey.

4. The device according to claim 3, the sensors being of one or more of: gyro based, pressure based, radar based, sonar based, or conductivity based sensors.

5. The device according to claim 1, wherein the inward face of the orbital inner ring comprising a circular contact field for connection with the slip ring connector to an electrical wiring being comprised in the stationary shaft part.

6. The device according to claim 5, wherein the a circular contact field is arranged as a pattern, wherein the pattern ensures that the slip ring connector is in contact with only a portion, one or more, of the transducers at the same time.

7. The device according to claim 6, wherein each transducer is in electrical contact with the circular contact field at a point radially arranged in line with the transducer position on the orbital inner ring.

8. The device according to claim 1, wherein the orbital outer ring is of a material having substantially the same acoustic impedance as the surface under survey.

9. The device according to claim 1, wherein the material type of the orbital inner ring and the orbital outer ring has an elasticity coefficient adapted to counteract the unevenness of the surface under survey.

10. The device according to claim 1, wherein each of the two or more wheel assemblies comprises a suspension device arranged to provide individual suspension to each wheel assembly.

11. The device according to claim 1, further comprising:
    a controller for controlling the signals to and from the transducers, communication means for communicating control signals to and from the transducers; and the one or more transducers are electrically connected to a power source.

12. A method for emitting and receiving of ultrasonic signal for enabling analysis of a test material, the method comprising:
    providing one or a plurality of systems according to claim 11;
    emitting ultrasonic signals from one or more transducers;
    receiving reflections of the emitted ultrasonic signals from the test material with one or more transducers; and
    storing and transferring the received ultrasonic signals to a computer means and analyzing the received ultrasonic signals.

13. The method according to claim 12, the method further comprising:
    moving the carriage along a predefined path;
    emitting ultrasonic signals from individual transducers according to a predefined emission pattern; and
    receiving the reflected ultrasonic signal from the test material with one or a plurality of transducers configured to be receiving transducers for the individual emitted ultrasonic signal.

14. The method according to claim 12, the method further comprising comparing the result of the analysis of a section of a test material with a previous analysis of the same section of the test material, and to identify changes in the test material.

15. The device according to claim 1, wherein the wheel assemblies have one or both sides of the rotating orbital outer ring a coupling means for connection to a neighbor wheel assembly or frame, and the coupling means further comprises connectors for transferring power and/or signals between the wheels, or between the wheels and a frame.

16. The device according to claim 1, wherein one or both peripheral ends of the stationary shaft part have attachment means for attaching the device to a frame.

17. The device according to claim 1, wherein the device comprises means for wireless transmission of control data and received signal data.

18. The device according to claim 1, wherein each individual transducer acts as either emitting transducer, or receiving transducer, or both emitting and receiving transducer.

19. The device for ultrasonic signal emission and reception of reflected ultrasonic signal from a test material, the device comprise comprising two or more wheel modules, each wheel modules comprising one or more wheel assemblies, according to claim 1, where the wheel modules are attached to a frame.

20. A system for ultrasonic signal emission and reception of ultrasonic signal, the system comprising:
    one or a plurality of device/wheel assemblies according to claim 1, the system further comprising a carriage to which the one or a plurality of wheel assemblies are mounted, a control mechanism for steering the carriage along a path over the surface of a test material, control logic for controlling the carriage, the transducers, and storing and communication of data.

21. The system according to claim 20, the system further comprises navigation means for providing absolute position, and/or tracking means for providing relative position.

22. The system according to claim 20, the system further comprising a display means.

23. The system according to claim 20, wherein the carriage is a remote operated vehicle, ROV, such as an underwater ROV for subsea operations.

24. The system according to claim 20, where the control mechanism for steering the carriage is a handle for manual guidance or a remote controlled motor connected to driving means for moving the carriage.

25. The system according to claim 20, the system further comprises local or remote computer means for receiving the received ultrasonic signal data and for processing the data.

* * * * *